Sept. 1, 1959 M. SHORR 2,902,371
METALLIC FOIL FOOD COOKING WRAPPER
Filed Feb. 8, 1957
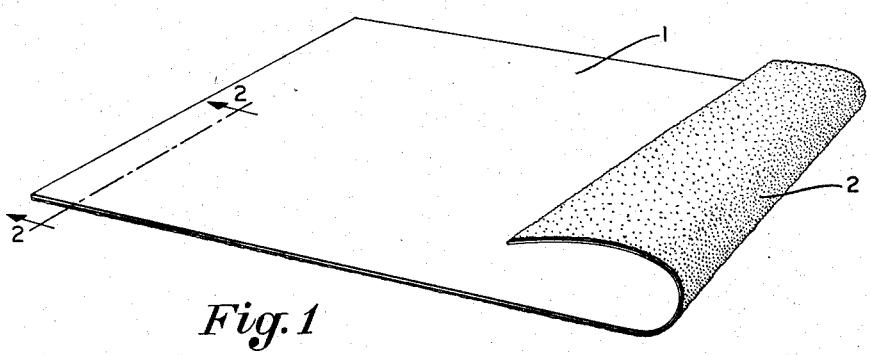
Fig. 1
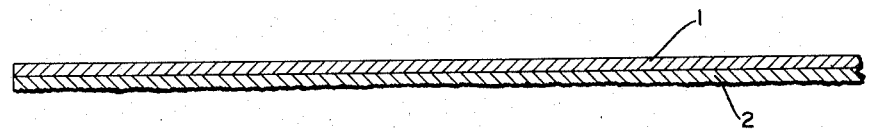
Fig. 2
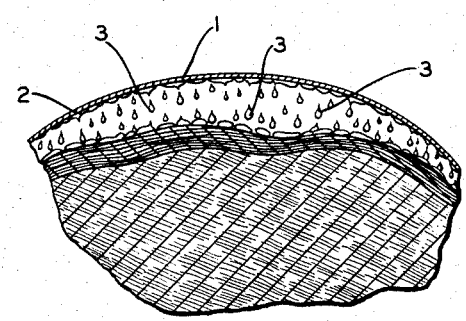
Fig. 3
Fig. 4
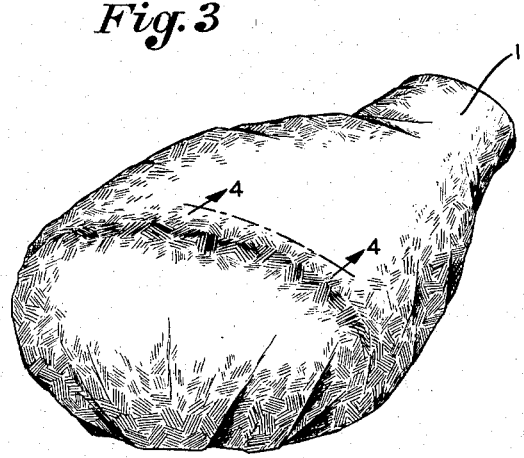
INVENTOR.
Morris Shorr
BY Frease & Bishop
ATTORNEYS

United States Patent Office 2,902,371
Patented Sept. 1, 1959

2,902,371

METALLIC FOIL FOOD COOKING WRAPPER

Morris Shorr, Canton, Ohio

Application February 8, 1957, Serial No. 638,945

4 Claims. (Cl. 99—171)

The invention relates to metallic foil used for cooking food and more particularly to a metallic aluminum foil to which has been applied a thin film or lamination of shortening whereby food which is wrapped and subsequently cooked, baked or roasted therein, is self basted.

When cooking food products such as roasts, hams, turkeys or any other type of fowl, it is necessary to baste the food product during the entire cooking procedure to insure that the food is juicy and tender. This is normally done by applying to the food either its own natural juices or some other form of shortening or fat prior to cooking and also during the cooking procedure.

In recent years it has been proposed to wrap the food article being cooked in a metallic foil to shorten the cooking time and to preserve the natural juices of the food article, but this procedure does not eliminate the necessity of performing a basting operation during cooking necessary to insure tenderness of the finished product, nor does it eliminate the necessity of brushing the food article with a fat or shortening prior to cooking.

I have discovered that by providing the metallic foil, in which the food is wrapped, with a thin coating or lamination of shortening, the necessity of basting an article of food during cooking, may be eliminated.

Accordingly, it is a general object of the present invention to provide a metallic foil food wrapper in which food wrapped and subsequently cooked therein, will be self basted.

Also it is an object of the present invention to provide a metallic foil food wrapper which preserves the natural juices of food being cooked therein.

Furthermore, it is an object of the present invention to provide a metallic foil food wrapper which eliminates the necessity of pre-brushing the food article with a shortening prior to cooking, and which eliminates the necessity of basting the food article during cooking.

Finally it is an object of the present invention to provide a new metallic food cooking wrapper which is not toxic to food products, which is simple and effective to use and which eliminates the foregoing problems and difficulties.

These and other objects and advantages, apparent to those skilled in the art from the following description and claims, may be obtained, the stated results achieved, and described difficulties overcome, by the elements, arrangements and discoveries which comprise the present invention, the nature of which is set forth in the following general statement, a preferred embodiment of which—illustrative of the best mode of which applicant has contemplated applying the principles—is set forth in the following description and shown in the drawing and which are particularly and distinctly pointed out and set forth in the appended claims forming part hereof.

The nature of the discoveries and improvements of the present invention may be stated in general terms as including a thin sheet of metallic, preferably aluminum foil, and a thin coating or lamination of shortening applied to one side of the metallic foil which is flexible and pliable and which adheres to the metallic foil at room temperatures but which melts and self bastes food products at normal roasting or cooking temperatures.

By way of example, an embodiment of the present invention is shown in the accompanying drawing in which:

Figure 1 is a perspective view of a sheet of metallic foil having a thin coating of shortening on one surface thereof;

Fig. 2 is an enlarged section taken on the line 2—2, Fig. 1;

Fig. 3 is a diagrammatic perspective view illustrating a food article wrapped in the improved coated metallic foil; and Fig. 4 is a fragmentary sectional view taken on the line 4—4, Fig. 3.

Similar numerals refer to similar parts throughout the several figures of the drawing.

In accordance with the invention, a thin sheet of metallic, preferably aluminum, foil, generally indicated at 1, is provided with a thin coating or lamination of shortening, indicated at 2, on one side or surface of sheet 1. The shortening 2, in accordance with the invention, should have certain desirable or preferred properties. At room temperatures, it should be hard and non-sticky. It should be a fat which is stable in a temperature range of from below freezing to at least 500° F. The shortening 2 also must be adherent to the metallic foil 1 at normal room temperatures but yet have sufficient flexibility and pliability, in coating thicknesses as thin as .015", to permit the shortening coated sheet 1 to be rolled in rolls for distribution and storage and to be formed about a food product as a wrapper as indicated in Fig. 3 without flaking or parting of the shortening from the foil.

Furthermore, the type of fat or fatty material used as the shortening coating should be non-reactive to the materials from which ordinary household cooking utensils are formed.

It is preferred, in accordance with the invention, that the shortening material 2 should have a melting point within the range of 175° F. to 200° F. However, the highest melting point pure fat available in commerce is tristearin which has a melting point of 163.4° F. In commercial form such fat may only be available in the form of fully hydrogenated soy bean oil which is approximately 75% tristearin and 3% tripalmitin with a melting point between 155° F. and 160° F.

However, such completely saturated triglyceride such as tristearin and tripalmitin is an extremely hard and brittle crystalline solid at temperatures below the melting point thereof.

It is therefore necessary, in accordance with the present invention, to blend a lower melting point fat, such as oleomargarine or other vegetable shortening, with the fully hydrogenated oil to obtain a mixture having sufficient flexibility and pliability and adhesive properties to be applied and held as a laminated coating on the metal foil 1, while retaining a melting point of between at least 140° F. and 150° F.

Another example of a fat which can be used as a material for the coating 2 is acetylated tristearin which is non-crystalline and very similar to a wax in physical consistency.

One of the critical features of the invention is the provision of the coating 2 of a material having a melting point of at least 140° F. in order that it will not be greasy at room temperatures when handled in wrapping food articles preparatory to cooking, and in order that it will adhere to the foil without melting, soaking off or running, during manufacture, shipment and storage under normal temperature conditions, both in the summer and winter.

In use, the article of food to be cooked is wrapped with the shortening-coated foil 1 as shown in Fig. 3, with the shortening coating 2 on the inside surface of the wrapping next to the food product. The shortening 2 adheres to the foil between the foil and the surface of the food product wrapped with the foil at normal room temperature.

When the wrapped food article is placed in an oven or stove and heated for the required cooking time and at the desired temperature, the shortening melts at an oven temperature above the melting point of the shortening, say, above 150° F. and droplets of the melted shortening, indicated at 3 in Fig. 4, drop or run from the inner surface of the foil 1 onto the surface of the food article to function as a basting material. This basting action occurs around the entire inner surface of the wrapped food product and thus bastes the food product throughout its surface.

As the cooking operation proceeds, the shortening, of course, mixes with the natural juices, including fatty material which may evolve from the food product, to continue the self-basting operation throughout the cooking cycle.

Accordingly, the improved shortening-coated metallic foil of the present invention enables metallic foil to be used to shorten the cooking time and preserve the natural juices of the food article, and at the same time eliminates the necessity of performing a basting operation during cooking or of brushing the food article with a fat or shortening prior to cooking. Rather, the improved shortening-coated foil material provides for self-basting of the food article wrapped therewith.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details shown.

Having now described the invention, the use of a preferred embodiment thereof, and the advantageous, new and useful results obtained thereby, the new and useful products, parts, elements and arrangements, and reasonable mechanical equivalents thereof obvious to those skilled in the art, are set forth in the appended claims.

I claim:

1. A cooking wrapper for enclosing an article of food, including a metallic foil sheet, a food-basting film on the side of the sheet adjacent an enclosed article of food, the film being composed of a shortening material which is pliable at room temperature and which has a melting point of above 140° F., whereby the shortening material melts and bastes an article of food at cooking temperatures.

2. A cooking wrapper for enclosing an article of food, including a metallic foil sheet, a pliable, edible coating of shortening material on the side of the sheet adjacent an enclosed article of food, the shortening material comprising a mixture of saturated triglyceride and a low-melting-point fat, which mixture has a melting point of above 140° F., whereby the shortening material melts and bastes an article of food at cooking temperatures.

3. A cooking wrapper for enclosing an article of food, including a metallic foil sheet, a food-basting shortening on the side of the sheet adjacent an enclosed article of food, the shortening having a mixture of tristearin, tripalmitin, and other vegetable shortening, which mixture has a melting point of above 140° F., whereby the shortening material melts and bastes an article of food at cooking temperatures.

4. A cooking wrapper for enclosing an article of food, including a metallic foil sheet, a food-basting shortening on the side of the sheet adjacent an enclosed article of food, the shortening including a mixture of fully hydrogenated soybean oil and other vegetable shortening, which mixture has a melting point of above 140° F., whereby the shortening material melts and bastes an article of food at cooking temperatures.

References Cited in the file of this patent

UNITED STATES PATENTS

| | | |
|---|---|---|
| 1,996,392 | Torrence et al. | Apr. 2, 1935 |
| 2,226,155 | Bjornson | Dec. 24, 1940 |
| 2,655,451 | Edgar | Oct. 13, 1953 |
| 2,759,830 | Touceda | Aug. 21, 1956 |

OTHER REFERENCES

Soyer: Soyer's Paper Bag Cookery, New York, Sturgis and Walton Co., 1911.